US006362595B1

(12) United States Patent
Burke

(10) Patent No.: US 6,362,595 B1
(45) **Date of Patent: *Mar. 26, 2002**

(54) VEHICLE WITH SUPPLEMENTAL ENERGY STORAGE SYSTEM FOR ENGINE CRANKING

(75) Inventor: James O. Burke, Richmond, IL (US)

(73) Assignee: Kold Ban International, Inc., Lake In The Hills, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/838,005

(22) Filed: Apr. 18, 2001

Related U.S. Application Data

(63) Continuation of application No. 09/652,687, filed on Aug. 31, 2000, now Pat. No. 6,242,887.

(51) Int. Cl.[7] .............................................. H01M 10/46
(52) U.S. Cl. ...................................... 320/104; 320/166
(58) Field of Search ................................ 320/104, 166, 320/167, 103, DIG. 33, DIG. 34

(56) References Cited

U.S. PATENT DOCUMENTS 4,492,912 A 1/1985 Nowakowski
4,494,162 A 1/1985 Eyler
5,321,389 A 6/1994 Meister
5,642,696 A 7/1997 Matsui
5,925,938 A 7/1999 Tamor
6,075,331 A 6/2000 Ando et al.
6,242,887 B1 * 5/2001 Burke ........................ 320/104

OTHER PUBLICATIONS

KBI Kapower Installation Operation Manual (KBI/Kold Ban International, Ltd. 1999).

KBI Kapower Supercapacitors (4–page Brochure KBI/Kold Ban International, Ltd. 1999).

Charge All Wheel Type Battery Chargers (Model 13–012 Boost All, Good All Mfg. 1999).

The Intra Switch, Intra USA 1998.

Battery Optimizer, Purkay's Fleet Electric Inc. 1999.

Low Voltage Disconnects Switches and Alarms, Sure Power Industries Inc. 1998.

* cited by examiner

*Primary Examiner*—Edward H. Tso
(74) *Attorney, Agent, or Firm*—Brinks Hofer Gilson & Lione

(57) ABSTRACT

A vehicle having an internal combustion engine that drives a generator and a cranking motor that cranks the engine is provided with a standard electrical system as well as a supplemental electrical system. This supplemental electrical system includes a capacitor that is charged by the primary electrical system of the vehicle and is protected against excessive discharge. When it is desired to start the engine, the capacitor is connected to the cranking motor to supply adequate cranking power to the cranking motor, regardless of the state of charge of the batteries.

11 Claims, 2 Drawing Sheets

VEHICLE WITH SUPPLEMENTAL ENERGY STORAGE SYSTEM FOR ENGINE CRANKING

CROSS REFERENCE TO RELATED APPLICATION

This application is a continuation of U.S. patent application Ser. No. 09/652,687, filed Aug. 31, 2000 now U.S. Pat. No. 6,242,887, which is hereby incorporated by reference in its entirety.

BACKGROUND

The present invention relates to vehicles of the type that include an internal combustion engine, a cranking motor, and a battery normally used to power the cranking motor. In particular, this invention relates to improvements to such systems that increase of the reliability of engine starting.

A problem presently exists with vehicles such as heavy-duty trucks. Drivers may on occasion run auxiliary loads excessively when the truck engine is not running. It is not unusual for heavy-duty trucks to include televisions and other appliances, and these appliances are often used when the truck is parked with the engine off. Excessive use of such appliances can drain the vehicle batteries to the extent that it is no longer possible to start the truck engine.

The present invention solves this prior or problem in a cost-effective manner.

SUMMARY

The preferred embodiment described below supplements a conventional vehicle electrical system with a capacitor. This capacitor is protected from discharging excessively when auxiliary loads are powered, and it is used to supply a cranking current in parallel with the cranking current supplied by the vehicle battery to ensure reliable engine starting. A battery optimizer automatically increases the voltage to which the capacitor is charged as the capacitor temperature falls, thereby increasing the power available for engine cranking during low temperature conditions.

This section has been provided by way of general introduction, and it is not intended to limit the scope of the following claims.

DETAILED DESCRIPTION OF THE PRESENTLY PREFERRED EMBODIMENT

Figure 1:
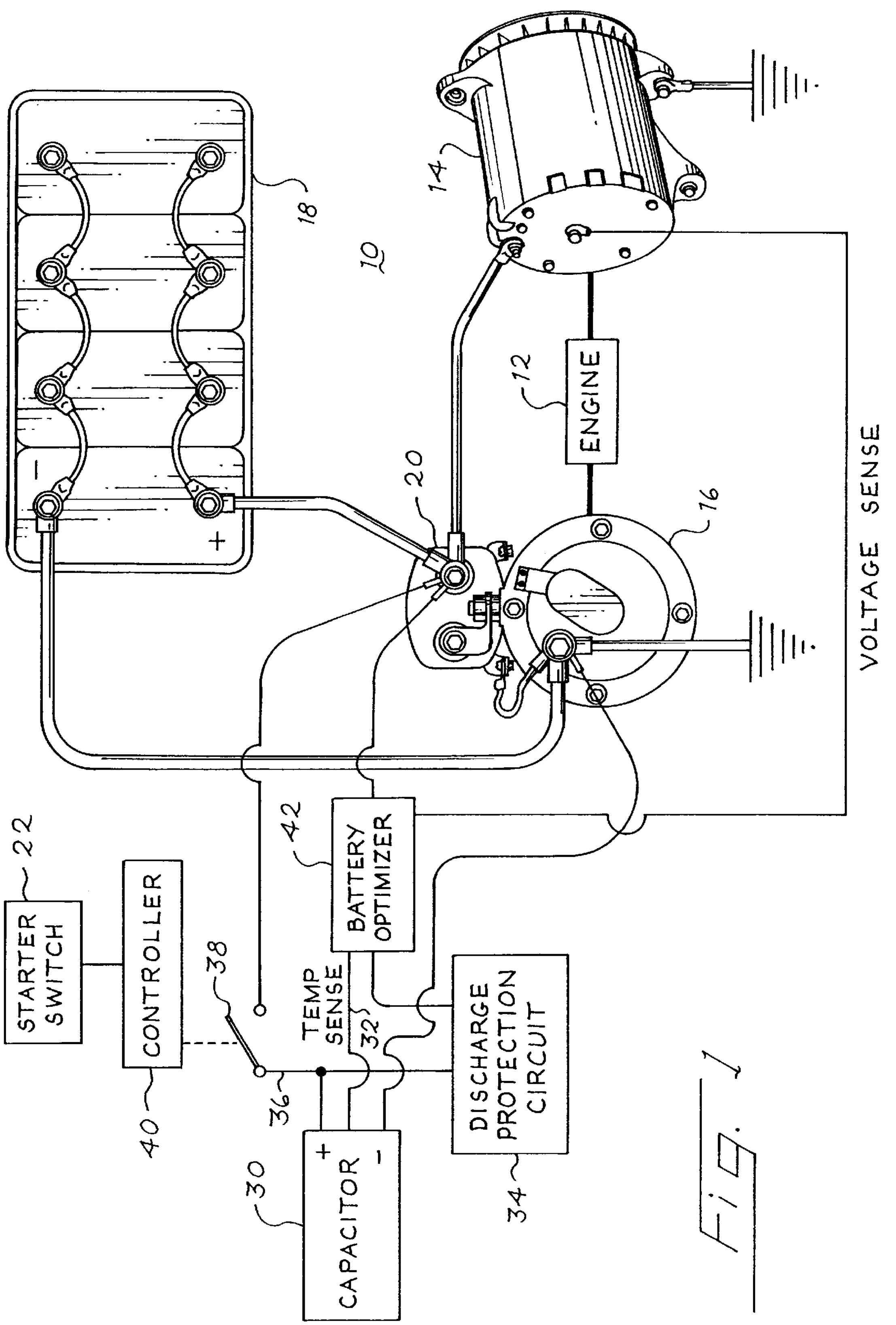
FIG. 1 is a block diagram of an electrical system for a vehicle that incorporates a preferred embodiment of this invention.

Turning down to the drawings, FIG. 1 shows an electrical system of a vehicle 10 that includes an internal combustion engine 12. The engine 12 can take any suitable form, and may for example be a conventional diesel or gasoline engine. The engine 12 drives a generator 14 that generates a DC voltage. As used herein, the term "generator" is intended broadly to encompass the widest variety of devices for converting rotary motion into electrical power, including conventional alternators, generators, and the like. The engine 12 is also mechanically coupled to a cranking motor 16. The cranking motor 16 can take any suitable form, and it is conventionally an electrical motor that is powered during cranking conditions by current from a storage battery 18 such as a conventional lead acid battery. Current from the battery 18 is switched to the cranking motor 16 via a switch such as a conventional solenoid switch 20. The solenoid switch 20 is controlled by a conventional starter switch 22.

All of the elements 10 through 22 described above may be entirely conventional, and are well-known to those skilled in the art. The present invention is well adapted for use with the widest variety of alternative embodiments of these elements.

In addition to the conventional electrical system described above, the vehicle 10 also includes a supplemental electrical system including a capacitor 30. The capacitor 30 is preferably a double layer capacitor of the type known in the art has an electrochemical capacitor. Suitable capacitors may be obtained from KBI, Lake in the Hills, IL under the trade name KAPower. For example, in one alternative the capacitor 30 has a capacitance of 1000 farads, a stored energy capacity of 60 kilojoules, an internal resistance at −30 degrees Celsius of 0.004 ohms, and a maximum storage capacity of 17 kilowatts. In general, the capacitor should have a capacitance greater than 320 farads, and an internal resistance at 20° C. that is preferably less than 0.008 ohms, more preferably less than 0.006 ohms, and most preferably less than 0.003 ohms. The energy storage capacity is preferably greater than 15 kJ. Such capacitors provide the advantage that they deliver high currents at low temperatures and relatively low voltages because of their unusually low internal resistance. Further information about suitable capacitors for use in the system of FIG. 1 can be found in publications of ESMA, Troitsk, Moscow region, Russia and on the Internet at www.esma-cap.com.

The capacitor 30 includes a negative terminal that is connected to system ground, and a positive terminal that is connected to the electrical system of the vehicle via a first signal path 32 and a second signal path 36. The first signal path 32 is used for charging the capacitor 30, and it includes two circuits 34, 42. The first circuit 34 operates to prevent excessive discharging of the capacitor 30. The circuit 34 can take many forms. In one example, the circuit 34 includes a low voltage disconnect circuit that disconnects the capacitor 30 from the electrical system of the vehicle when the voltage on the first path 32 falls below a preselected level. For example, the circuit 34 may open the first path 32 when the voltage on the first path 32 falls below 11.8 volts. Higher or lower voltages may be used. In this example, the capacitor 30 receives charging currents from the generator 14 via the first path 32, and the capacitor 30 supplies current to various loads in the electrical system of the vehicle until the voltage in the first path 32 falls below the selected level. A suitable device for performing this function can be obtained from Sure Power Industries, Inc., Tualatin, Oreg. as model number 13600.

In another example, the circuit 34 may simply include a suitably sized diode oriented to pass charging currents from the generator 14 to the capacitor 30 while blocking discharging currents from the capacitor 30 via the first path 32. Many other alternatives are possible, as long as the first circuit 34 achieves the desired function of protecting the capacitor 30 against excessive discharge, thereby ensuring that the capacitor 30 maintains an adequate charge to start the engine 12.

Figure 2:
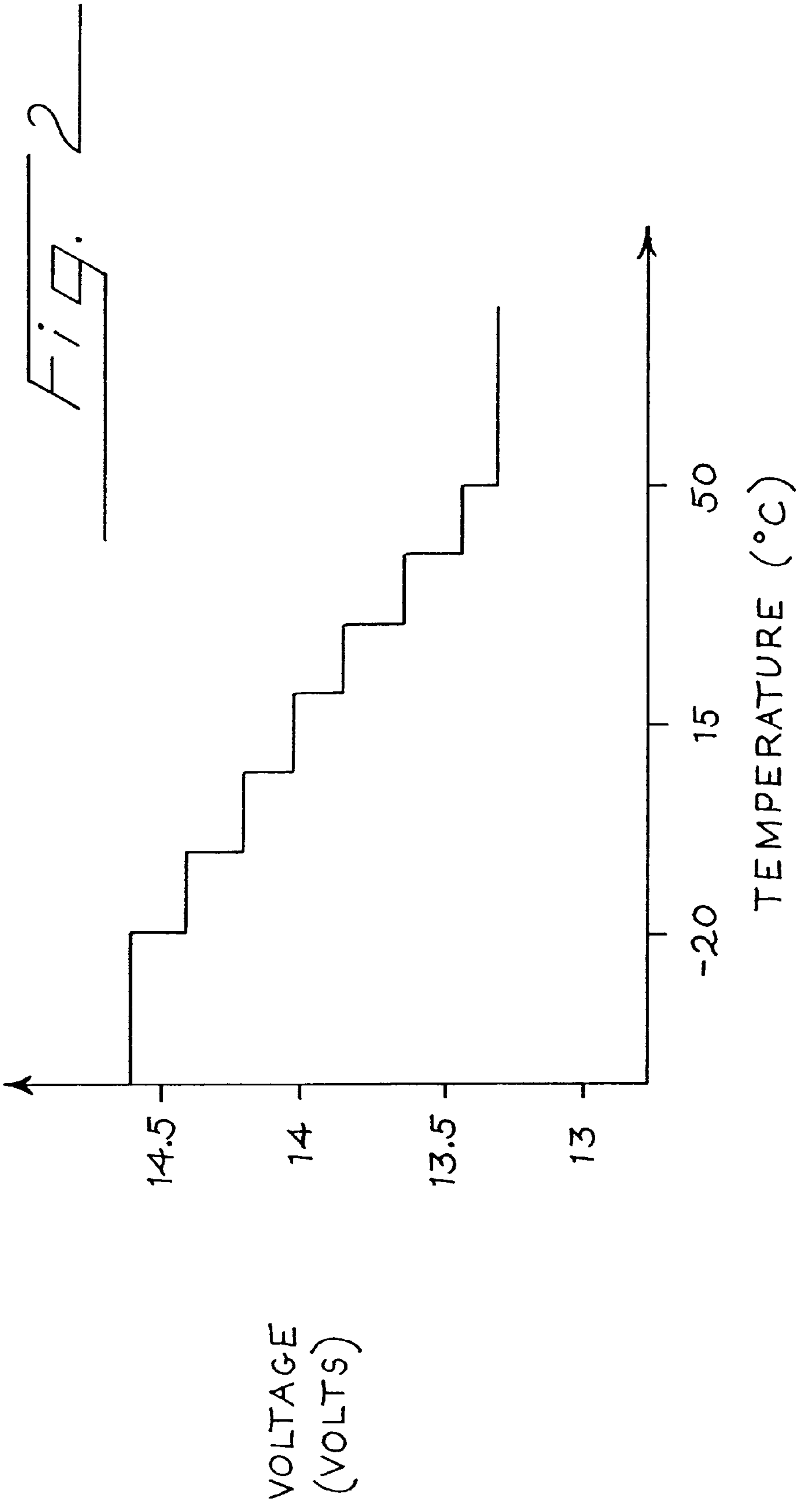
FIG. 2 is a graph illustrating operation of the circuit 42 of FIG. 1.

The circuit 42 is included in the first path 32 to optimize the charging voltage applied to the capacitor 30 for the presently prevailing temperature. The circuit 42 increases the charging voltage applied to the capacitor 30 at low temperatures, when engine starting requirements are increased and conventional battery performance is decreased. FIG. 2 shows one example of a suitable voltage profile as a function of temperature. Note that the temperature is preferably the temperature of the capacitor 30, and the charging voltage applied to the capacitor 30 is greater below a selected temperature (such as zero degrees Celsius) than it is at a higher temperature (such as +30 degrees Celsius). The profile of FIG. 2 is intended by way of example and many other profiles can be used, including profiles that are continuous in slope as well as stepwise profiles.

The circuit 42 can take many forms. For example, a conventional battery optimizer can be used, such as that supplied by Purkey's Fleet Electric, Inc., Rogers, Ariz. Such battery optimizers control the voltage applied to the voltage sense input of the generator 14, thereby altering the regulated voltage generated by the generator 14. Alternately, the circuit 42 can include a DC to DC converter that converts a voltage generated by the generator 14 to the desired charging voltage, which can vary as a function of temperature in accordance with the profiles discussed above.

The second path 36 connects the capacitor 30 to the cranking motor 16 via a high amperage switch 38. The switch 38 may for example be a MOSFET switch such as that sold by IntraUSA under the trade name Intra switch.

The switch 38 is controlled by a switch controller 40 that is in turn coupled with the starter switch 22 of the vehicle 10. The controller 40 holds the switch 38 in an open circuit condition except when the starter switch 22 commands engine cranking, at which time the switch 38 is closed. Thus, the controller 40 causes the switch 38 to be closed during cranking conditions and opened during non-cranking conditions. The controller 40 can take many forms, including conventional analog and digital circuits. Microprocessors can also readily be adapted to perform the functions of the controller 40. It is not essential in all cases that the switch 38 be in an open circuit condition at all times other than when the engine 12 is being cranked. For example, the controller 40 may allow the switch 38 to remain in the closed circuit condition after engine cranking has terminated, as long as the voltage supplied by the capacitor 30 does not fall below a desired level, one that which the capacitor 30 stores sufficient power to start the engine 12 reliably. In this case, the first path 32 and the circuit 34 may be eliminated, and the circuit 42 may be placed in the second path 36.

The system of FIG. 1 provides a number of important advantages. First, the supplemental electrical system including the capacitor 30 provides adequate current for reliable engine starting, even if the battery 18 is substantially discharged by auxiliary loads when the engine 12 is not running. If desired, the supplemental electrical system including the capacitor 30 may be made invisible to the user of the vehicle. That is, the vehicle operates in the normal way, but the starting advantages provided by the capacitor 30 are obtained without any intervention on the part of the user.

Additionally, the capacitor 30 provides the advantage that it can be implemented with an extremely long life device that can be charged and discharged many times without reducing its efficiency in supplying adequate cranking current.

As used herein, the term "coupled with" is intended broadly to encompass direct and indirect coupling. Thus, first and second elements are said to be coupled with one another whether or not a third, unnamed, element is interposed therebetween. For example, two elements may be coupled with one another by means of a switch.

The term "battery" is intended broadly to encompass a set of batteries including one or more batteries.

The term "set" means one or more.

The term "path" is intended broadly to include one or more elements that cooperate to provide electrical interconnection, at least at some times. Thus, a path may include one or more switches or other circuit elements in series with one or more conductors.

Of course, many alternatives are possible. The functions of the elements of 34, 38, 40, 42 may if desired all be integrated into a single device. Is anticipated that such integration may simplify packaging requirements and reduce manufacturing costs. Any appropriate technology can be used implement the functions described above.

The foregoing description has discussed only a few of the many forms that this invention can take. For this reason, this detailed description is intended by way of illustration, not limitation. It is only the claims, including all equivalents, that are intended to define the scope of this invention.

What is claimed is:

1. In a vehicle comprising an internal combustion engine, a generator driven by the engine, a cranking motor coupled with the engine to crank the engine, and a battery coupled with the cranking motor, the improvement comprising:

a double layer capacitor characterized by a capacitance greater than 320 farads and an internal resistance at 1 kHz and 20° C. less than 0.008 ohms;

a set of paths interconnecting the generator and the capacitor, said set of paths comprising a circuit for preventing the capacitor from discharging excessively and a switch;

a switch controller operative to open the switch automatically to protect the capacitor against excessive discharge during non-cranking conditions, and to close the switch automatically during cranking conditions.

2. The invention of claim 1 wherein the circuit comprises a diode oriented to pass charging currents to the capacitor and to block discharging currents from the capacitor.

3. The invention of claim 1 wherein the circuit comprises a low-voltage disconnect circuit.

4. The invention of claim 1 wherein the switch controller is operative to hold the switch open except during cranking conditions.

5. In a vehicle comprising an internal combustion engine, a generator driven by the engine, a cranking motor coupled with the engine to crank the engine, and a battery coupled with the cranking motor, the improvement comprising:

a double layer capacitor characterized by a capacitance greater than 320 farads and an internal resistance at 1 kHz and 20° C. less than 0.008 ohms;

a set of paths interconnecting the generator and the capacitor, said set of paths comprising first means for preventing the capacitor from discharging excessively and a switch;

second means for opening the switch automatically to protect the capacitor against excessive discharge during non-cranking conditions, and for closing the switch automatically during cranking conditions.

6. The invention of claim 5 wherein the first means comprises a diode oriented to pass charging currents to the capacitor and to block discharging currents from the capacitor.

7. The invention of claim 5 wherein the first means comprises a low-voltage disconnect circuit.

8. The invention of claim 5 wherein the second means is operative to hold the switch open except during cranking conditions.

9. The invention of claim 1 or 5 wherein the capacitor is characterized by a storage energy capacity greater than 15 kJ.

10. The invention of claim 1 or 5 wherein the capacitor is characterized by an internal resistance at 1 kHz and 20° C. less than 0.006 ohms.

11. The invention of claim 1 or 5 wherein the capacitor is characterized by an internal resistance at 1 kHz and 20° C. less than 0.003 ohms.

* * * * *